United States Patent
Xie et al.

(10) Patent No.: US 7,860,317 B2
(45) Date of Patent: Dec. 28, 2010

(54) GENERATING SEARCH RESULTS BASED ON DUPLICATE IMAGE DETECTION

(75) Inventors: Xing Xie, Beijing (CN); Wei-Ying Ma, Beijing (CN); Xin Fan, Hefei (CN); Yinghua Zhou, Beijing (CN)

(73) Assignee: Microsoft Corporation, Redmond, WA (US)

( * ) Notice: Subject to any disclaimer, the term of this patent is extended or adjusted under 35 U.S.C. 154(b) by 934 days.

(21) Appl. No.: 11/278,575

(22) Filed: Apr. 4, 2006

(65) Prior Publication Data

US 2007/0237426 A1   Oct. 11, 2007

(51) Int. Cl.
*G06K 9/46* (2006.01)
*G06K 9/00* (2006.01)
(52) U.S. Cl. .................. 382/195; 382/154; 382/305
(58) Field of Classification Search .............. 382/305
See application file for complete search history.

(56) References Cited

U.S. PATENT DOCUMENTS

| | | | |
|---|---|---|---|
| 5,852,823 A * | 12/1998 | De Bonet | 707/6 |
| 5,873,080 A | 2/1999 | Coden et al. | |
| 6,711,293 B1 * | 3/2004 | Lowe | 382/219 |
| 6,748,398 B2 * | 6/2004 | Zhang et al. | 707/104.1 |
| 7,457,825 B2 | 11/2008 | Li et al. | |
| 2002/0168117 A1 | 11/2002 | Lee et al. | |
| 2004/0022442 A1 * | 2/2004 | Kim | 382/225 |
| 2005/0018904 A1 * | 1/2005 | Davis | 382/181 |
| 2006/0218192 A1 | 9/2006 | Gopalakrishnan | |
| 2009/0041366 A1 | 2/2009 | Li et al. | |

OTHER PUBLICATIONS

Lowe, D.G. (Nov. 2004) "Distinctive image features from scale-invariant keypoints." Int'l Journal of Comptuer Vision, vol. 60 No. 2, pp. 91-110.*
Sivic et al. (Sep. 2004) "Efficient object retrieval from videos." Proc. $12^{th}$ European Signal Processing Conference, pp. 1737-1740.*
Google, Inc. (Aug. 2001) "Google Frequently Asked Questions: Image Search." http://images.google.com/help/faq_images.html as archived by The Internet Archive http://www.archive.org/.*
Lowe, D.G. (Dec. 2001) "Local feature view clustering for 3d object recognition." Proc. 2001 IEEECS Conf. on Computer Vision and Pattern Recognition, vol. 1 pp. 682-688.*

(Continued)

*Primary Examiner*—Brian P Werner
*Assistant Examiner*—Barry Drennan
(74) *Attorney, Agent, or Firm*—Perkins Coie LLP

(57) ABSTRACT

A method and system for searching for content relating to a target or query image by identifying duplicate images with associated content is provided. An image search system identifies visual parts of objects within the target image based on analysis of two or more versions of the target image. The image search system identifies visual parts based on analysis of the versions. The image search system then identifies images of an image database that have visual parts that are similar to the visual parts of the target image. The image search system may rank the identified images based on their likelihood of being duplicates of the target image and provide their associated content as the search result ordered according to the ranking of the images.

17 Claims, 11 Drawing Sheets

OTHER PUBLICATIONS

Carneiro et al. (Jul. 2004) "Flexible spatial models for grouping local image features." Proc. 2004 IEEECS Conf. on Computer Vision and Pattern Recognition, vol. 2 pp. 747-754.*

Se et al. (May 2001) "Vision-based mobile robot localization and mapping using scale-invariant features." Proc. 2001 IEEE Int'l Conf. on Robotics and Automation, vol. 2 pp. 2051-2058.*

Brown et al. (2002) "Invariant features from interest point groups." Proc. 2002 British Machine Vision Conference, pp. 656-665.*

Smith, John R. and Shih-Fu Chang, "Visually Searching the Web for Content," IEEE Multimedia, vol. 4, Issue 3, Jul. 1997, pp. 12-20.

Muneesawang, Paisarn et al., "Audio Visual Cues for Video Indexing and Retrieval," Advances in multimedia information processing, ACM 2004, Oct. 29, 2004, pp. 642-649.

Srihari, Rohini K. et al., "Intelligent Indexing and Semantic Retrieval of Multimodal Documents," information Retrieval, vol. 2, 2000, pp. 245-275.

Goh, King-Shy et al., "Multimodal Concept-Dependent Active Learning for Image Retrieval," MM'04, Oct. 10-16, 2004, New York, New York, pp. 564-571.

Zhang et al., "Detecting Image Near-Duplicate by Stochastic Attribute Relational Graph Matching with Learning," Proceedings of ACM International Conference on Multimedia, New York, Oct. 10-16, 2004.

Flickner, Myron, et al., "Query by Image and Video Content: The QBIC System," IEEE Computer Special Issue on Content-Based Retrieval, vol. 28, No. 9, Sep. 1995 (10 pages).

Jaimes, Alejandro, et al., "Detection of Non-Identical Duplicate Consumer Photographs," in Proceedings of the Fourth Pacific Rim Conference on Multimedia, vol. 1, Singapore, Dec. 2003 (4 pages).

Ke, Yan, et al., "Efficient Near-Duplicate Detection and Sub-image Retrieval," In Proc. of ACM Multimedia, Nov. 2004 (7 pages).

Sivic, Josef and Zisserman, Andrew, "Video Google: A Text Retrieval Approach to Object Matching in Videos," Proceedings of the Ninth IEEE International Conference on Computer Vision, Oct. 2003 (8 pages).

Yeh, Tom et al., "Searching the Web with Mobile Images for Location Recognition," Proceedings of the 2004 IEEE Computer Society Conference on Computer Vision and Pattern Recognition (CVPR '04), 2004 (6 pages).

Yeh, Tom, et al., "A Picture is Worth a Thousand Keywords: Image-Based Object Search of a Mobile Platform," Proceedings of CHI 2005, Portland, Apr. 2004 (4 pages).

Fritzke, Bernd, "Growing Cell Structures—A Self-organizing Network for Unsupervised and Supervised Learning," TR-93-026, May 1993, International Computer Science Institute.

Lowe, David G., "Distinctive Image Features from Scale-Invariant Keypoints," Jan. 5, 2004, International Journal of Computer Vision, 2004.

* cited by examiner

GENERATING SEARCH RESULTS BASED ON DUPLICATE IMAGE DETECTION

BACKGROUND

Many search engine services, such as Google and Overture, provide for searching for information that is accessible via the Internet. These search engine services allow users to search for display pages, such as web pages, that may be of interest to users. After a user submits a search request (i.e., a query) that includes search terms, the search engine service identifies web pages that may be related to those search terms. To quickly identify related web pages, the search engine services may maintain a mapping of keywords to web pages. This mapping may be generated by "crawling" the web (i.e., the World Wide web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. The search engine service may generate a relevance score to indicate how relevant the information of the web page may be to the search request based on the closeness of each match. The search engine service then displays to the user links to those web pages in an order that is based on a ranking that may be determined by their relevance, popularity, importance, and some other measure.

These search engine services, however, may not be particularly useful in certain situations. In particular, it can be difficult to formulate a suitable search request that effectively describes the needed information. For example, if a person sees a historical building or a famous sculpture, the person after returning home may formulate a search request such as "historical building near the James River" or "sculpture of soldier on horse" in hopes of finding more information about the building or sculpture. Unfortunately, the search result may identify so many web pages that it may be virtually impossible for the person to locate relevant information even assuming that the person can accurately remember the details of the building or the sculpture. If the person has a mobile device, such as a personal digital assistant ("PDA") or cell phone, the person may be able to submit the search request while near the building or the sculpture. Such mobile devices, however, have limited input and output capabilities, which make it both difficult to enter the search request and to view the search result, which may include links to hundreds of web pages.

If the person, however, is able to take a picture of the building or sculpture, the person may then be able to use a Content Based Information Retrieval ("CBIR") system to find a similar looking picture. Unfortunately, CBIR systems cannot perform fine-grain image matching that is sufficient to effectively identify pictures of the same object (e.g., building or sculpture). Other systems that use local features have achieved satisfying results in object recognition and duplicate images detection. Since an image may have hundreds and thousands of salient points that are represented by local features, a system that uses such local features may have to process features for millions of salient points. Such processing is too computationally expensive to be practical for object recognition and duplicate image detection by an image search engine service.

SUMMARY

A method and system for searching for content relating to a target or query image by identifying duplicate images with associated content is provided. An image search system identifies visual parts of objects within the target image based on analysis of two or more versions of the target image. The image search system identifies visual parts based on analysis of the versions. The image search system then identifies images of an image database that have visual parts that are similar to the visual parts of the target image. The image search system may rank the identified images based on their likelihood of being duplicates of the target image and provide their associated content as the search result ordered according to the ranking of the images.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
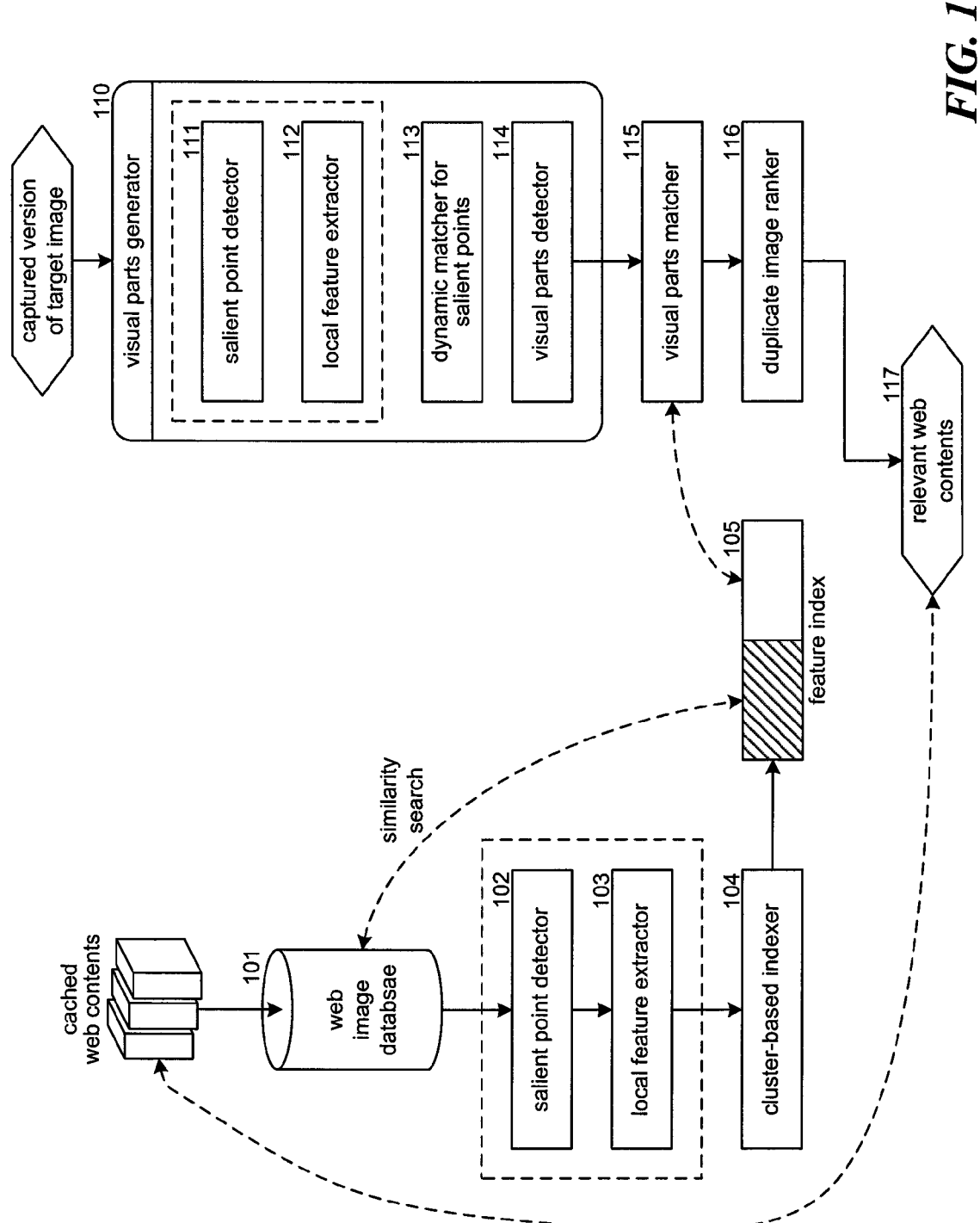
FIG. 1 is a block diagram that illustrates the processing of the image search system in one embodiment.

A method and system for searching for content relating to a target or query image by identifying duplicate images with associated content is provided. In one embodiment, an image search system identifies visual parts of objects within the target image based on analysis of two or more versions of the target image. For example, a person viewing a historical building may take pictures of the building from two different perspectives. Each perspective is a different version of an image of the building. The image search system identifies visual parts based on analysis of the versions. Because the image search system analyzes multiple versions of an image, the image search system can filter out "artifact" visual parts that appear only in a single version of the image. The image search system then identifies images of an image database that have visual parts that are similar to the visual parts of the target image. The image search system may rank the identified images based on their likelihood of being duplicates of the target image and provide their associated content as the search result ordered according to the ranking of the images. As describe below in detail, the image search system can identify duplicate images more accurately than typical CBIR systems and more efficiently than typical systems that use local features of salient points.

In one embodiment, the image search system identifies visual parts of a target image as a group of matching salient points that are proximate to each other in each version of the image. Salient points are locations of attributes of the object of an image that may help distinguish the object from other objects. For example, a building within a target image may have salient points at the corners of the building, at the corners of the windows, at the top of a pinnacle, at a cornice near the corner of the building, and so on. The image retrieval system identifies the salient points within the versions of a target image and generates for each salient point a "feature" that contains information describing the areas around the salient point. For example, the feature may include average color, rate of color change in various directions, and so on. To identify a visual part, the image search system attempts to locate matching salient points between the versions. A matching salient point is a salient point that represents the same location on an object of the target image. For example, the salient points of the first version and the second version that correspond to the upper northeast corner of a building are matching salient points. The image search system identifies salient points based on similarity of the features of the salient points. In particular, a salient point of the first version matches a salient point of the second version when their features are very similar. The search system then identifies groups of matching salient points (e.g., three or more) that represent "visual parts" of the object of an image. A group of matching salient points represents a visual part when the matching salient points of the first version are proximate to each other and the matching salient points of the second version are also proximate to each other. For example, each version may have salient points corresponding to the upper northeast corner of a building, the finger of a gargoyle near the corner, and a portion of a cornice near the corner. Visual parts thus represent a visually distinctive local area of an object of a target image that appears in multiple versions of the image.

In one embodiment, the image search system uses the visual parts of a target image to identify duplicate images from a database of images that maps the images to relevant content. The person who captured the target image may want to find information about the objects of the image. To search for the information, the person submits the first version and the second version of the target image to the image search system. The image search system may maintain a database of images that are mapped to web pages containing information or content about the images. For example, the database may contain an image of a historical building with a mapping to information (e.g., links to web pages) describing the construction of the building, the tenants of the building, the architect of the building, and so on. The image search system maintains an index that maps the features of the salient points of the images to the corresponding image. For example, if the database contains an image of the historical building, then the index may contain the features of the salient points corresponding to the upper northeast corner, the finger of the gargoyle, and the cornice near the corner. To locate a duplicate image, the image search system uses the index to identify images that have salient points with features that are similar to the features of the salient points of the visual parts. The image search system then selects, based on the similar salient points, the images of the database that appear to be duplicates. The image search system then retrieves the information (e.g., links to web pages) associated with the duplicate images and provides that information to the person as the search result. In this way, the image search system can efficiently identify duplicate images and provide information associated with the duplicate image as a search result.

In one embodiment, the image search system identifies salient points and their features using a scale-invariant feature transform technique. A scale-invariant feature transform ("SIFT") technique is described in Lowe, D., "Distinctive Features from Scale-Invariant Keypoints," International Journal of Computer Vision, vol. 60, no. 2, pp. 91-110, 2004, which is hereby incorporated by reference. The SIFT technique described by Lowe identifies salient points as locations of an image that can be accurately identified regardless of scale of the image and regardless of many different transforms of the image (e.g., different perspective angles and distances). The SIFT technique uses a cascade filtering approach to identify candidate salient points. The SIFT technique identifies locations that can be repeatedly located under differing views of the same object by searching for stable features across all possible scales. The SIFT technique then performs a detailed fit to the nearby data for location, scale, and ratio of principal curvatures for each candidate salient point. The SIFT technique rejects candidate salient points that have low contrast and are poorly localized along an edge. The SIFT technique then generates a local image descriptor (i.e., "feature") for each salient point. The SIFT technique generates features that are orientation invariant by first computing the gradient magnitude and orientation of each image sample in a region around the salient point. The SIFT technique then accumulates these samples into orientation histograms summarizing the content over a 4×4 region. Each histogram may have eight bins representing different orientations resulting in a feature that is represented by a 128 (4×4×8) feature vector. One skilled in the art will appreciate that other techniques may be used to identify the salient points of an image and the features of the salient points.

FIG. 1 is a block diagram that illustrates the processing of the image search system in one embodiment. The image search system includes a generate index phase and a duplicate image detection phase. The image search system generates a feature (or local descriptor) index from a web image database 101 that is used to facilitate duplicate image detection. The web image database contains images collected from the web using a web crawler and maps each image to relevant web pages. Alternatively, the database may be populated manually with images, such as images of a particular domain (e.g., historical buildings), along with associated information (e.g., names of current tenants). The generate index phase processes each image of the web image database using a salient point detector 102 and a local feature extractor 103, which may be implemented using a SIFT technique. The generate index phase then uses a cluster-based indexer 104 to create a feature index 105 that maps the generated features to their corresponding images of the web image database. In one embodiment, the generate index phase uses a cluster-based indexing technique as described in Fritzke, B., "Growing Cell Structures—A Self-Organizing Network for Unsupervised and Supervised Learning," Neural Networks, 7(9), 1994, pp. 1441-1460, which is hereby incorporated by reference. One skilled in the art will appreciate that a variety of indexing techniques can be used to facilitate rapid identification of images of the database that have features that are similar to features of a target image. The duplicate image detection phase of the image search system receives multiple versions of a target image, such as frames collected from a video camera, and uses the feature index to identify duplicate images. The duplicate image detection phase identifies the visual parts of the target image using a visual parts generator 110. The visual parts generator includes a salient point detector 111 and a local feature extractor 112 for extracting features of salient points of the versions of the target image using the same technique used by the generate index phase. The visual parts generator includes a dynamic matcher 113 for matching salient points between versions (e.g., frames) of the target image based on similarity between features. The visual parts generator includes a visual parts detector 114 for grouping matching salient points into visual parts. The duplicate image detection phase then uses a visual parts matcher 115 to identify via the feature index images of the web image database that have visual parts with salient points having features similar to the features of the salient points of the visual parts of the target image. The duplicate image detection phase then uses a duplicate image ranker 116 to rank the images based on likelihood of being duplicates of (i.e., a version of) the target image. The image search system then retrieves the content associated with the highest ranking images and provides that content as the search result for the target image.

Figure 1A:
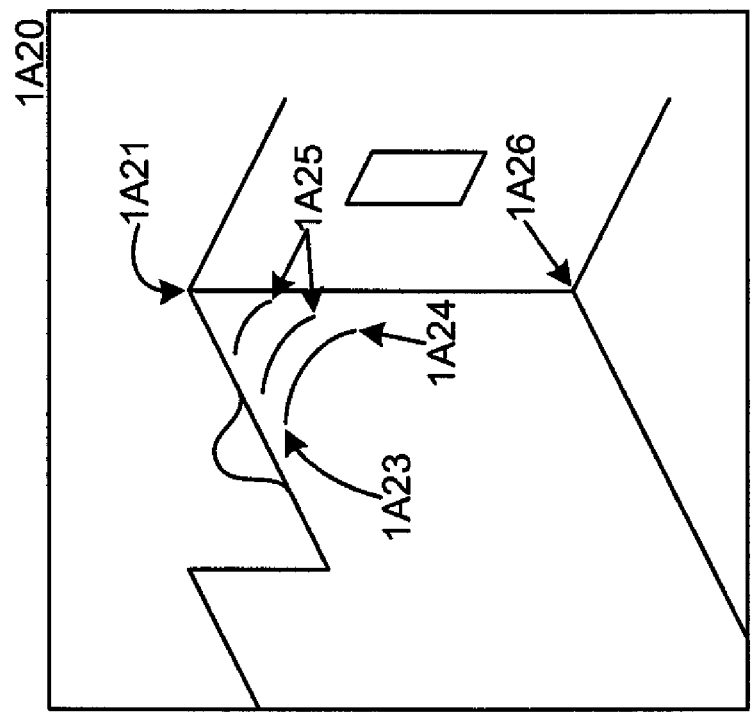
FIG. 1A is a diagram that illustrates the identification of visual parts in one embodiment.
Figure 1A:
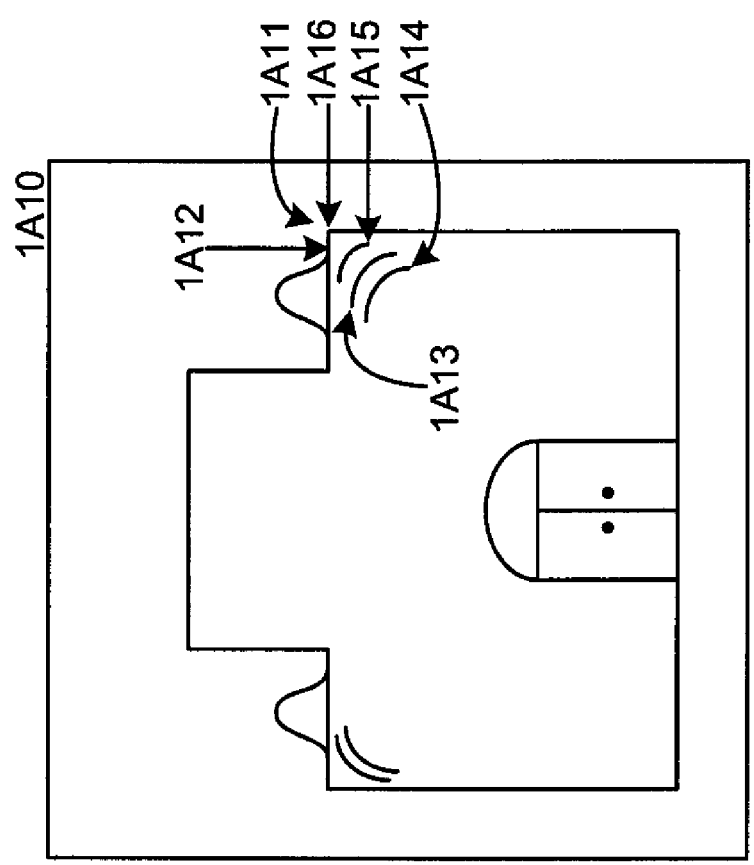

FIG. 1A is a diagram that illustrates the identification of visual parts in one embodiment. Versions 1A10 and 1A20 represent a target image of a building taken at different perspectives and distances. The image search system identifies salient points 1A11, 1A12, 1A13, 1A14, 1A15, and 1A16 of version 1A10 and salient points 1A21, 1A23, 1A24, 1A25, and 1A26 of version 1A20. The image search system may determine that salient points 1A11 and 1A21, 1A13 and 1A23, 1A14 and 1A24, 1A15 and 1A25, and 1A16 and 1A26 are matching pairs of salient points. Salient point 1A12 does not have a matching salient point since it is not visible in the perspective of version 1A20. The image search system identifies the visual parts of (1A11, 1A13, 1A14), (1A11, 1A13, 1A15), (1A11, 1A14, 1A15), and (1A13, 1A14, 1A15) because those triples of salient points and their triples of matching salient points are proximate to each other in each version. However, the image search system does not identify any visual parts that contain salient point 1A16 because its matching salient point 1A26 is at a very different location (i.e., not proximate) in version 1A20. Salient points 1A16 and 1A26 thus by chance had similar features event though they corresponded to very different locations on the object of the image.

Figure 2:
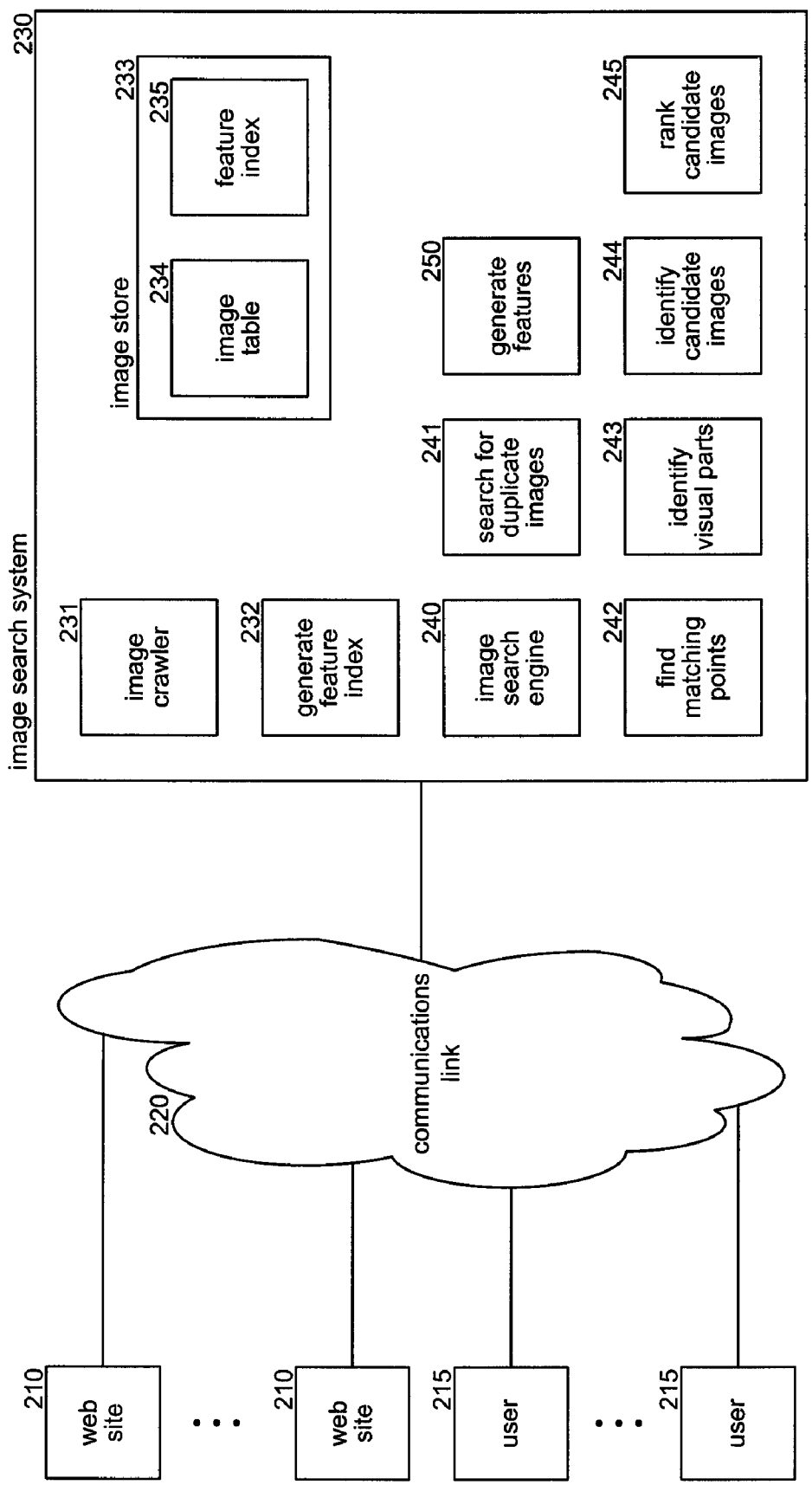
FIG. 2 is a block diagram that illustrates components of the image search system in one embodiment.

FIG. 2 is a block diagram that illustrates components of the image search system in one embodiment. The image search system 230 is connected to web sites 210 and user computing devices 215 via communications link 220. The image search system includes an image crawler component 231, a generate feature index component 232, and an image store 233. The image crawler component crawls various web sites identifying images and their associated content. The image crawler component stores the images and references to associated content in an image table 234 of the image store. After the images are collected by the crawler, the generate feature index component generates an index of the features of the images of the image table to facilitate duplicate image detection. The generate feature index component invokes a generate features component 250 to generate the features of the salient points for each image. The generate feature index component then creates a feature index 235 in the image store. The image search system also includes an image search engine component 240, a search for duplicate images component 241, a find matching points component 242, an identify visual parts component 243, an identify candidate images component 244, and a rank candidate images component 245. The image search engine component receives versions of a target image as a query, locates a duplicate image in the image store, and returns the associated content as the search result. The image search engine component invokes the search for duplicate images component to identify the duplicate images. The image search engine component then returns as the search result the content associated with the images that are most likely duplicates. The search for duplicate images component invokes the generate features component to generate the features for the salient points of the versions of the target image. The search for duplicate images component then invokes the find matching points component to identify matching points between different versions of the image. The search for duplicate image component invokes the identify visual parts component to identify visual parts of the image, which are groups of matching salient points that are proximate to each other in each version of the image. The search for duplicate images component invokes the identify candidate images component to identify images that have features of the salient points that are similar to the features of the salient points of the visual parts of the target image. The search for duplicate images component then invokes the rank candidate images component to rank the candidate images according to likelihood of being a duplicate of the target image based on visual parts of the candidate images that match visual parts of the target image.

The computing devices on which the image search system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the image search system. In addition, the data structures may be stored or transmitted via a data transmission medium, such as a signal on a communications link. Various communications links may be used to connect components of the system, such as the Internet, a local area network, a wide area network, a point-to-point dial-up connection, a cell phone network, and so on.

Embodiments of the image search system may be implemented in various operating environments that include personal computers, server computers, multiprocessor systems, microprocessor-based systems, network PCs, minicomputers, mainframe computers, distributed computing environments that include any of the above systems or devices, and so on. The user computing devices may include cell phones, personal digital assistants, smart phones, personal computers, programmable consumer electronics, digital cameras, and so on.

The image search system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
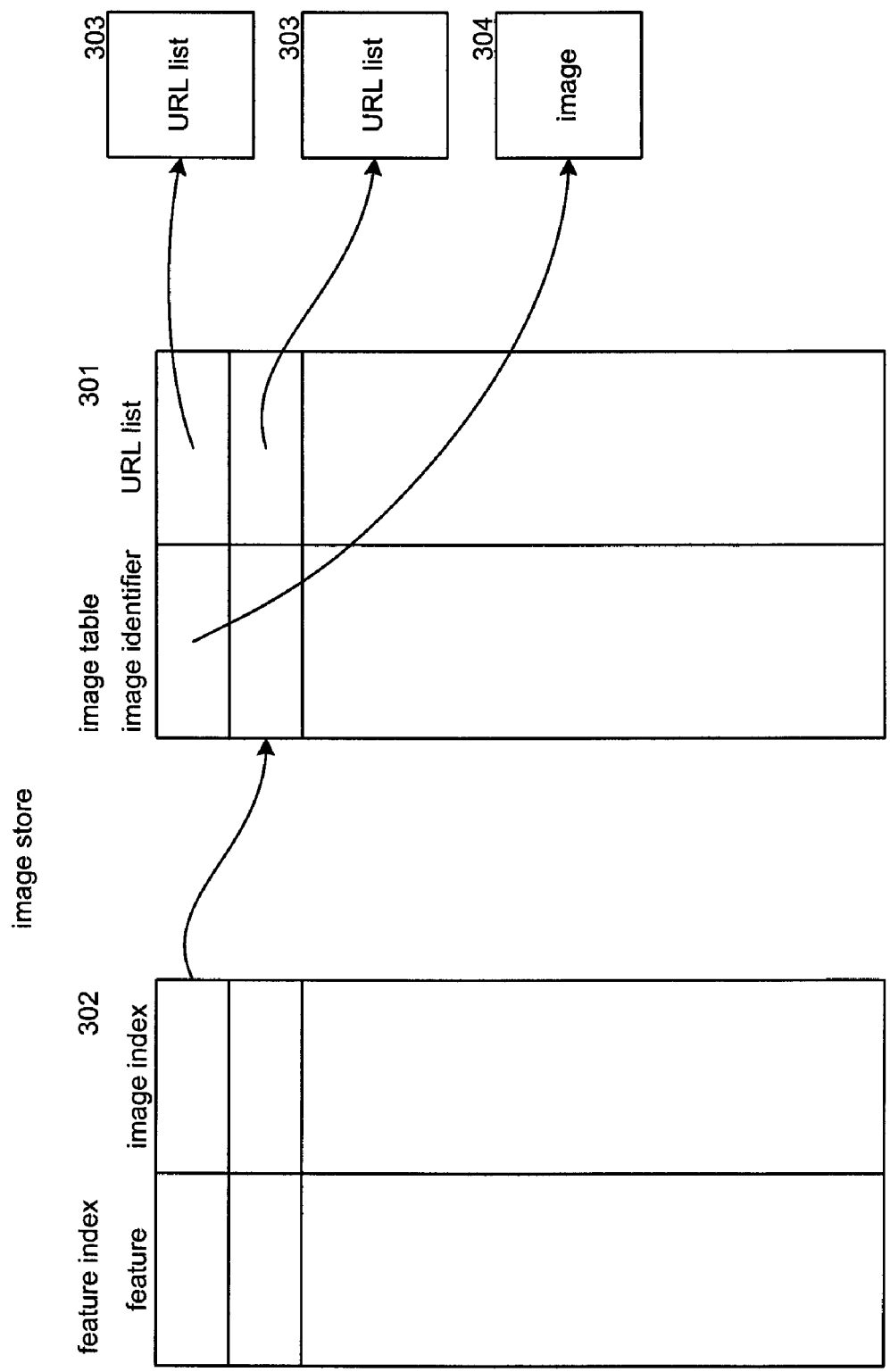
FIG. 3 is a block diagram that illustrates a logical organization of the image store in one embodiment.

FIG. 3 is a block diagram that illustrates a logical organization of the image store in one embodiment. The image store includes an image table 301 and a feature index 302. The image table contains mappings from image identifiers to URL list identifiers. An image identifier references an image 304 and a URL list identifier references a URL list. The referenced URL list contains URLs to web pages with content relating to the image identified by the image identifier. The feature index maps features of salient points of images to their corresponding entry in the image table. In one embodiment, each entry of the feature index may represent a cluster of features that are similar and provide a mapping to the images with features in that cluster.

Figure 4:
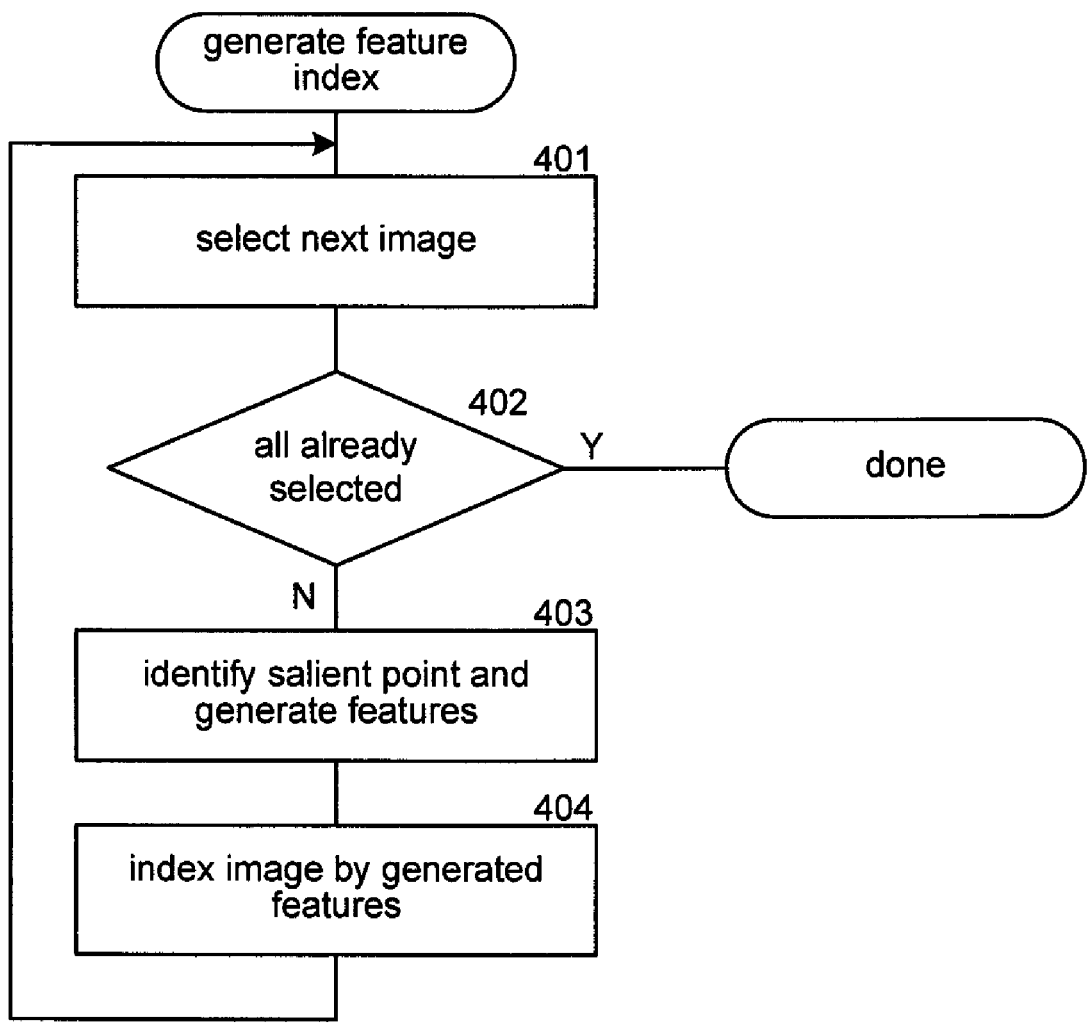
FIG. 4 is a flow diagram that illustrates the processing of the generate feature index component of the image search system in one embodiment.

FIG. 4 is a flow diagram that illustrates the processing of the generate feature index component of the image search system in one embodiment. The component generates the feature index for the image store. The component loops selecting each image of the image store and updating the feature index to map features of salient points of the selected image to the image. In block 401, the component selects the next image of the image store. In decision block 402, if all the images have already been selected, then the component completes, else the component continues at block 403. In block 403, the component identifies the salient points of the selected image and generates the features for the salient points. In block 404, the component indexes the selected image based on the generated features and then loops to block 401 to select the next image.

Figure 5:
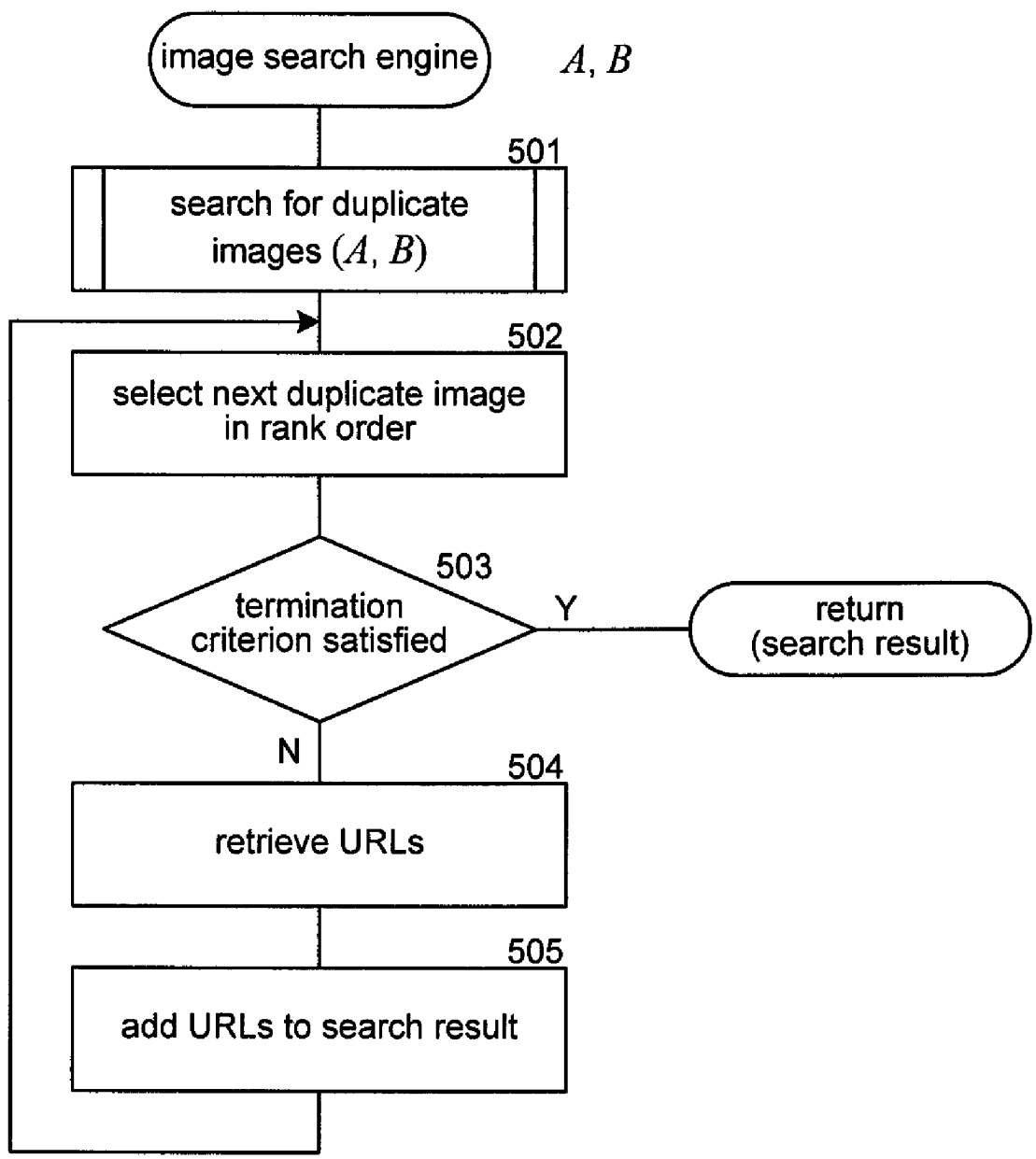
FIG. 5 is a flow diagram that illustrates the processing of the image search engine component of the image search system in one embodiment.

FIG. 5 is a flow diagram that illustrates the processing of the image search engine component of the image search system in one embodiment. The component is passed to versions A and B of the target image, identifies duplicate images, and returns content associated with the duplicate images as a search result. In block 501, the component invokes the search for duplicate images component passing versions A and B. In blocks 502-505, the component loops selecting the duplicate images in rank order and retrieving their content until a termination criterion is satisfied. In block 502, the component selects the next duplicate image in rank order. In decision block 503, if a termination criterion is satisfied, then the component returns the retrieved content as the search result, else the component continues at block 504. The termination criterion may be satisfied when sufficient content has been retrieved or when it appears that the selected duplicate image has a low probability of actually being a duplicate of the target image (e.g., only one visual part in common). In block 504, the component retrieves the URLs associated with the selected duplicate image. In block 505, the component adds the retrieved URLs to the search result. The component then loops to block 502 to select the next duplicate image.

Figure 6:
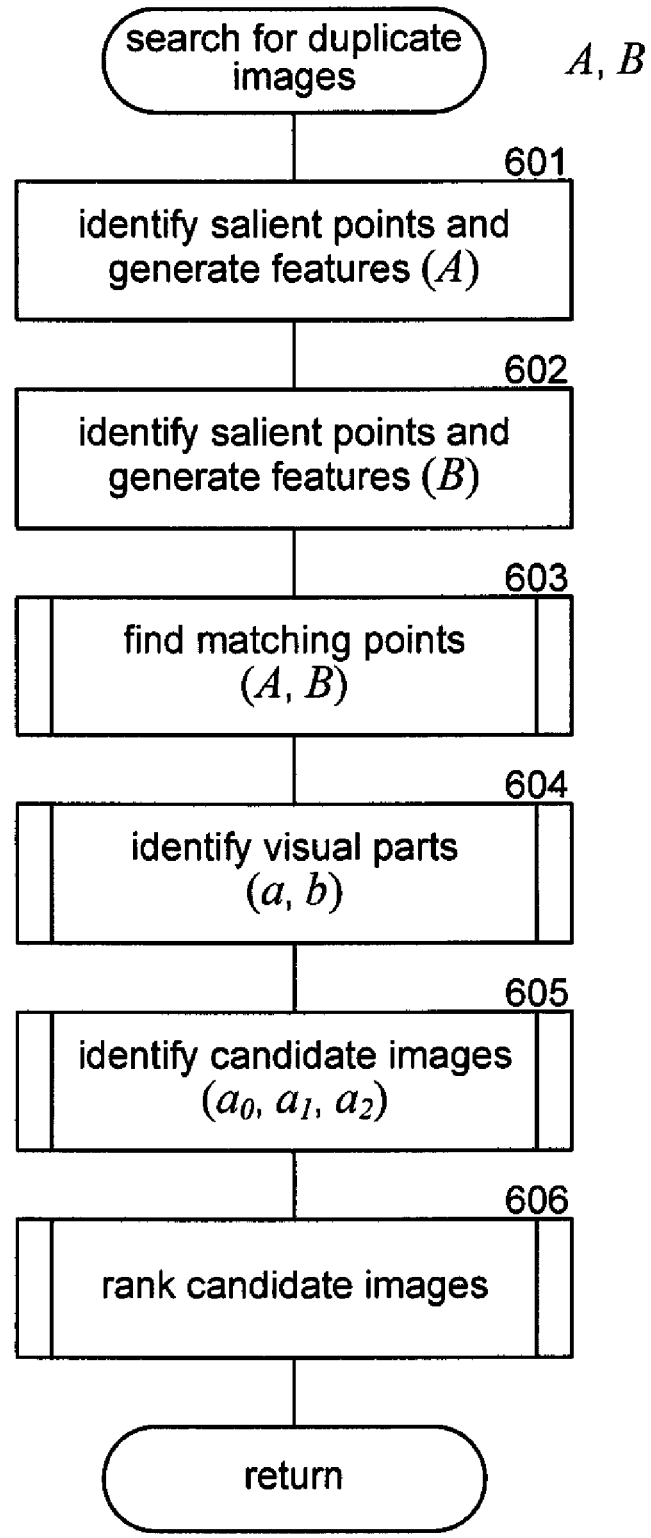
FIG. 6 is a flow diagram that illustrates the processing of the search for duplicate images component of the image search system in one embodiment.

FIG. 6 is a flow diagram that illustrates the processing of the search for duplicate images component of the image search system in one embodiment. The component is passed versions A and B of a target image and identifies duplicate images from the image store. In block 601, the component identifies salient points for version A and generates their features. In block 602, the component identifies salient points for version B and generates their features. In block 603, the component invokes the find matching points component passing versions A and B and receiving an indication of the matching salient points in return. In block 604, the component invokes the identify visual parts component to identify visual parts from the matching salient points. In block 605, the component invokes the identify candidate images component passing the visual parts and receiving an indication of the candidate images. In block 606, the component invokes the rank candidate images component to rank the candidate images based on the number of visual parts they have in common with the target image. The component then returns.

Figure 7:
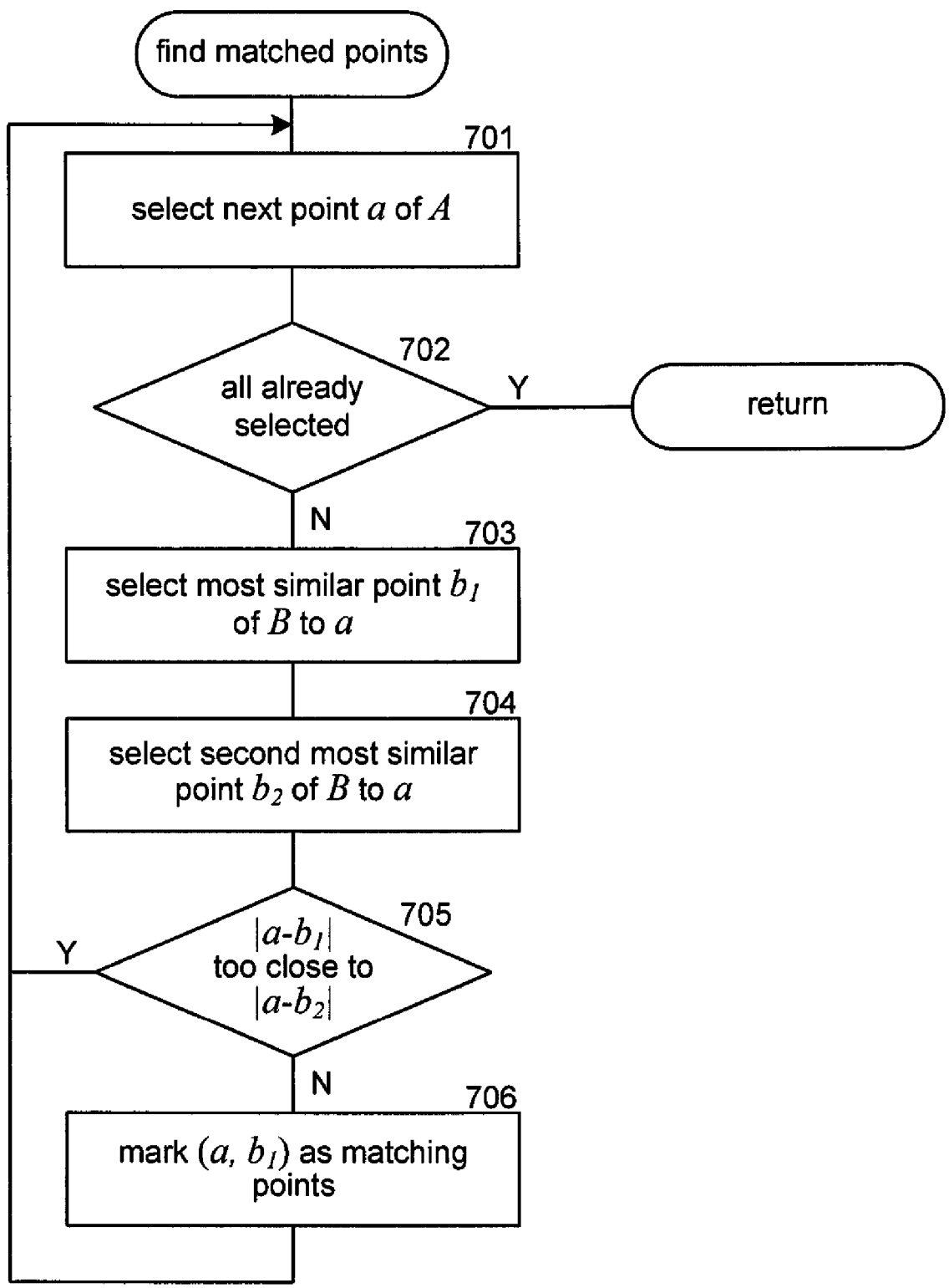
FIG. 7 is a flow diagram that illustrates the processing of the find matching points component of the image search system in one embodiment.

FIG. 7 is a flow diagram that illustrates the processing of the find matching points component of the image search system in one embodiment. The component is passed versions A and B of the target image and returns pairs that identify a salient point of version A that matches a salient point of version B. In block 701, the component selects the next salient point a of version A. In decision block 702, if all the salient points of version A have already been selected, then the component returns, else the component continues at block 703. In block 703, the component selects the salient point $b_1$ of version B that has the most similar feature to the feature of the selected salient point a of version A. The component may use an L2 norm as the distance metric in feature space. In block 704, the component selects the salient point $b_2$ of version B that has the second most similar feature to the feature of the selected salient point a of version A. In decision block 705, if the features of the salient points $b_1$ and $b_2$ are both very similar to the feature of salient point a, then the component discards salient point a as having a matching salient point because it cannot determine which salient point of version B is the actual matching salient. The component then discards the salient point by looping to block 701. Otherwise, the component continues at block 706. In block 706, the component marks the pair (a, $b_1$) as matching salient points and then loops to block 701 to select the next salient point of version A.

Figure 8:
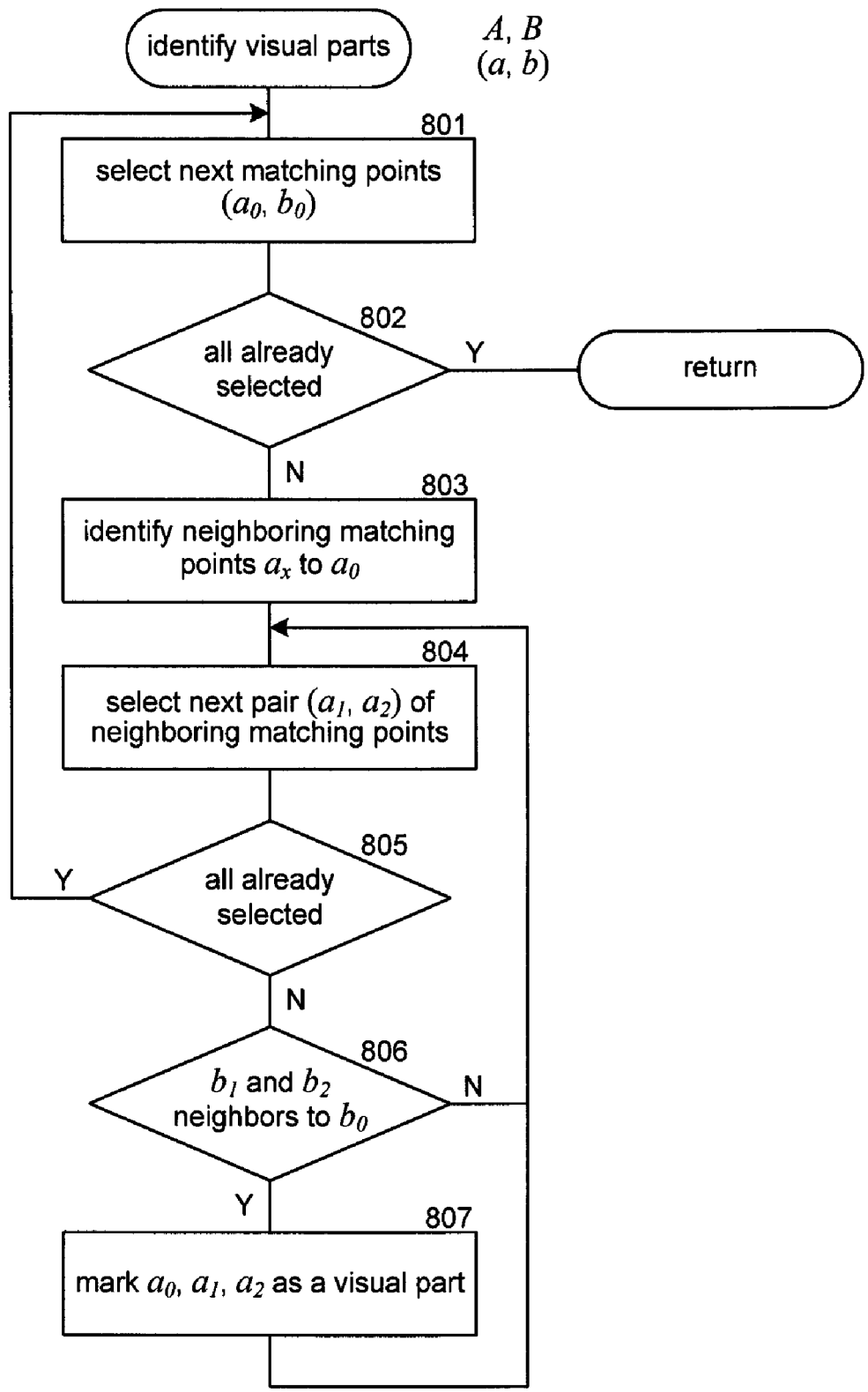
FIG. 8 is a flow diagram that illustrates the processing of the identify visual parts component of the image search system in one embodiment.

FIG. 8 is a flow diagram that illustrates the processing of the identify visual parts component of the image search system in one embodiment. The component is passed versions A and B of the target image along with a list of the matching salient points (a, b) and identifies the visual parts from the matching salient points. In block 801, the component selects the next matching salient points ($a_0$, $b_0$) from the list. In decision block 802, if all the matching salient points have already been selected, then the component returns the identified visual parts, else the component continues at block 803. In block 803, the component identifies the neighboring matching points $a_x$ in version A to the salient point $a_0$. Neighboring matching salient points are salient points that are proximate to each other within the version of the image. For example, neighboring salient points of a point are points within a certain radius of that point. In one embodiment, the radius is a constant factor of the scale of the version. In blocks 804-807, the component loops selecting each pair of neighboring matching salient points $a_1$ and $a_2$ in version A and determining whether the matching points $b_1$ and $b_2$ are also neighbors in version B of the matching salient point $b_0$ that matches the selected point $a_0$. In block 804, the component selects the next pair of neighboring matching salient points $a_1$ and $a_2$ in version A. In decision block 805, if all the pairs have already been selected, then the component loops to block 801 to select the next matching points, else the component continues at block 806. In decision block 806, if the matching salient points $b_1$ and $b_2$ are also neighbors to matching point $b_0$ in version B, then the component continues at block 807, else the component loops to block 804 to select the next pair of neighboring matching points. In block 807, the component marks the triple $a_0$, $a_1$, and $a_2$ as being a visual part and then loops to block 804 to select the next pair of neighboring matching points. In this embodiment, the image search system defines visual parts that have three salient points. In alternate embodiments, the image search system may define visual parts using more than three salient points.

Figure 9:
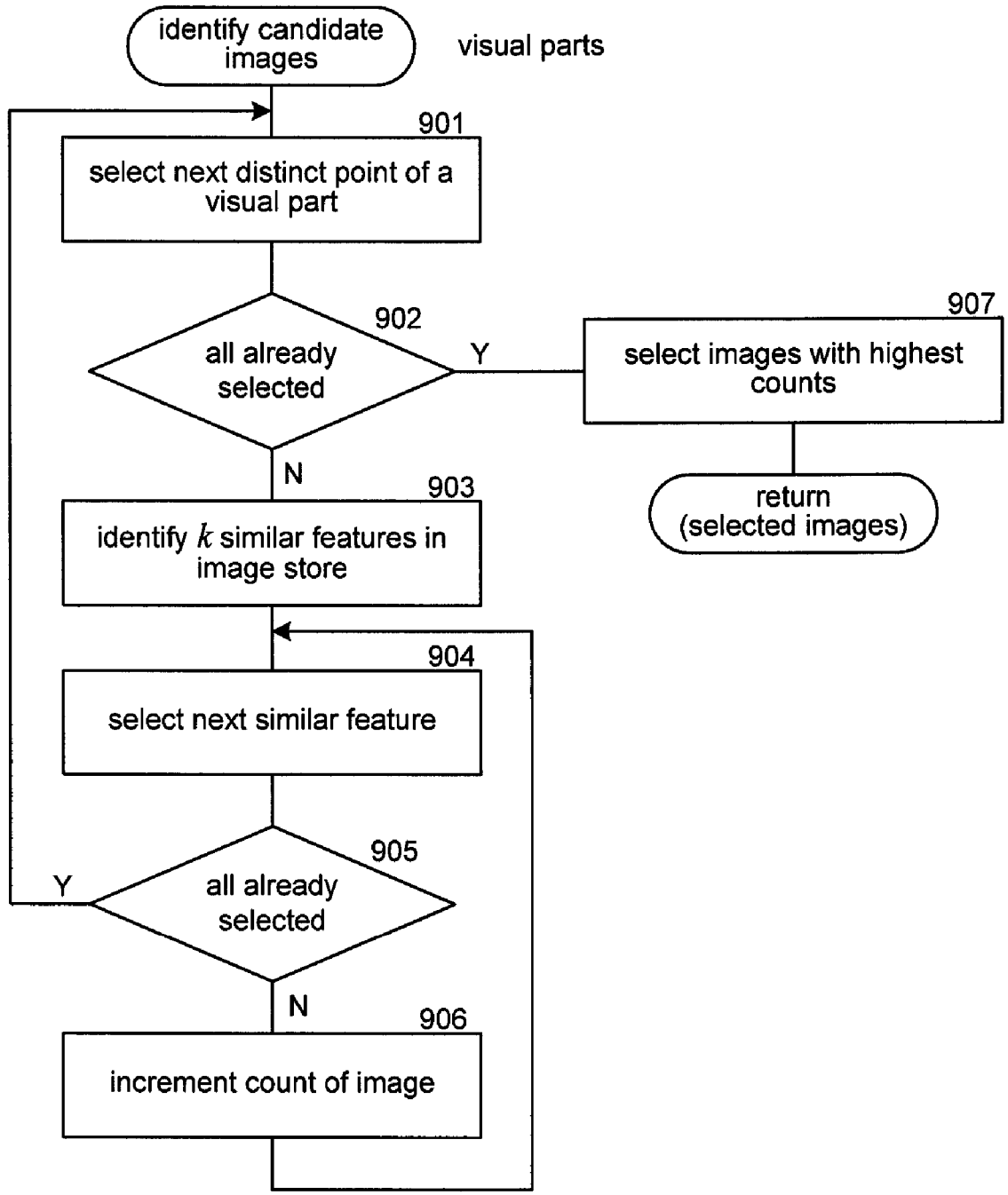
FIG. 9 is a flow diagram that illustrates the processing of the identify candidate images component of the image search system in one embodiment.

FIG. 9 is a flow diagram that illustrates the processing of the identify candidate images component of the image search system in one embodiment. The component is passed the visual parts of the target image and identifies images that have salient points with features that are similar to a feature of a salient point of visual parts. In block 901, the component selects the next distinct salient point of a visual part. The same salient point may occur in multiple visual parts (e.g., point 1A11 of FIG. 1A). Even though there may be multiple occurrences of the salient point, the component selects the salient point only once. In decision block 902, if all the distinct salient points have already been selected, then the component continues at block 907, else the component continues at block 903. In block 903, the component identifies some number k of features that are most similar to the feature of the selected distinct salient point. In blocks 904-906, the component loops incrementing a count for each image of the number of features the image has in common with distinct features of a visual part. In block 904, the component selects the similar feature identified using the feature index. In decision block 905, if all the similar features have already been selected, then the component loops to block 901 to select the next distinct salient point, else the component continues at block 906. In block 906, the component increments the count associated with the image or images referenced by a feature index for the selected similar feature. The component then loops to block 904 to select the next similar feature. In block 907, the component selects images with the highest counts. The component then returns the selected images with the highest counts.

Figure 10:
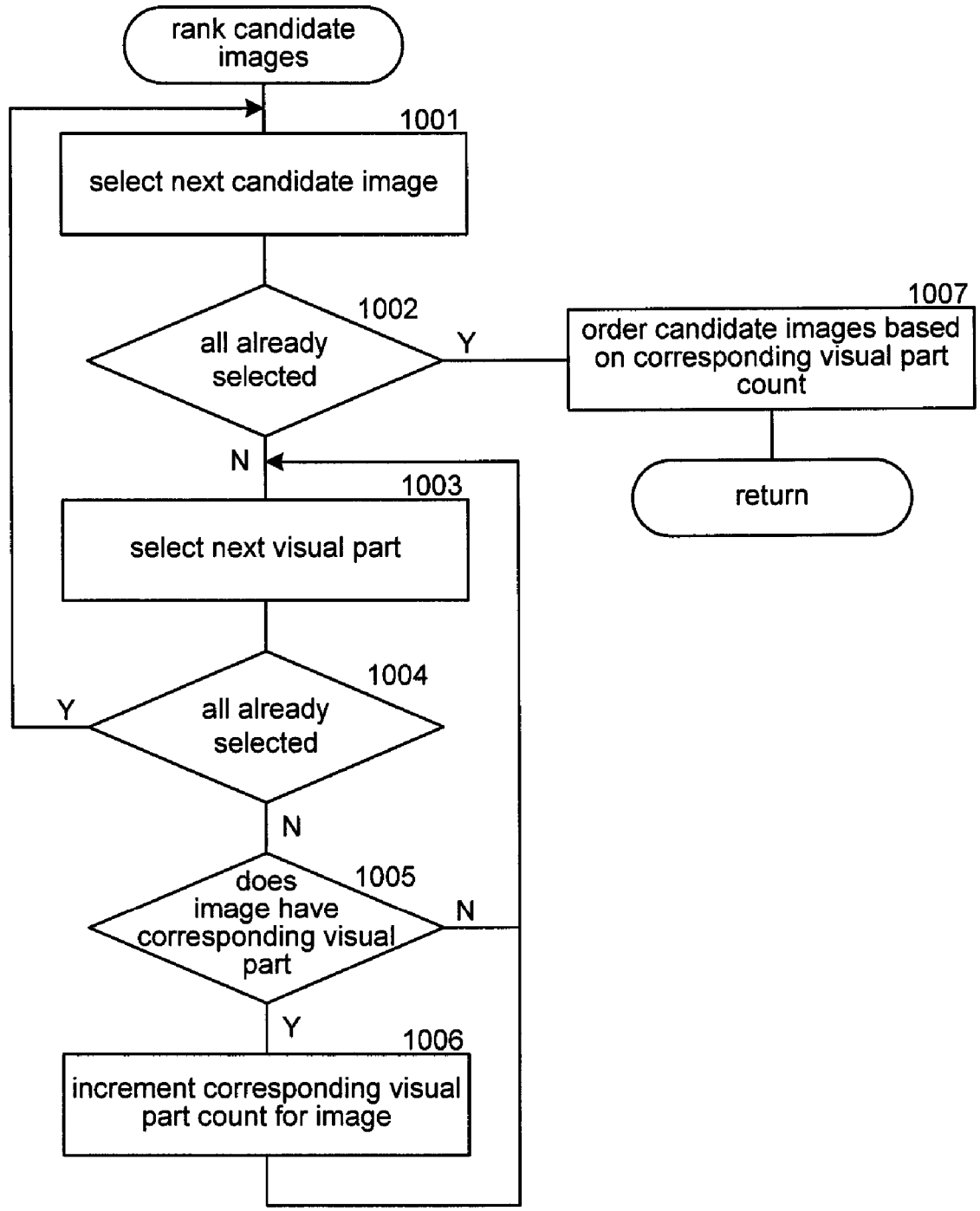
FIG. 10 is a flow diagram that illustrates the processing of the rank candidate images component of the image search system in one embodiment.

FIG. 10 is a flow diagram that illustrates the processing of the rank candidate images component of the image search system in one embodiment. The component ranks the candidate images based on the number of visual parts of the target image that are found in the candidate image. In block 1001, the component selects the next candidate image. In decision block 1002, if all the candidate images have already been selected, then the component continues at block 1007, else the component continues at block 1003. In blocks 1003-1006, the component loops selecting the visual parts of the target image and counting the number of corresponding visual parts of the selected candidate image. In block 1003, the component selects the next visual part. In decision block 1004, if all the visual parts have already been selected, then the component loops to block 1001 to select the next candidate image, else the component continues at block 1005. In decision block 1005, if the selected candidate image has a visual part corresponding to the selected visual part, then the component continues at block 1006, else the component loops to block 1003 to select the next visual part. In block 1006, the component increments the count of the corresponding visual parts for the selected candidate image and then loops to block 1003 to select next visual part. In block 1007, the component orders the candidate images based on the count of the visual parts it has in common with the target and then returns.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, the image search system may analyze a sequence of pictures of an object to more accurately identify visual parts. For example, a person may take a 30-second video of the outside of a historical building as the person walks toward the building. The person may submit the video to the image search system to search for information relating to the building. Upon receiving the video, the image search system may select 10 frames spaced three seconds apart and identify visual parts from those "versions" of the image of the building. The image search system may detect matching points as salient points with similar features in three or more sequential frames. Similarly, the image search system may identify visual parts as groups of matching salient points that are neighbors in three or more sequential frames. Visual parts identified based on more than two versions may be more distinctive visual parts of the image than can be identified based on only two versions. Accordingly, the invention is not limited except as by the appended claims.

We claim:

1. A system for identifying an image that matches a target image based on visual parts of the target image, comprising:
   a collection of images, each image having salient points, each salient point having a feature vector;
   a first version and a second version of the target image, each version having salient points;
   a memory storing computer-executable instructions of
      a component that identifies matching points, each matching point being a salient point of the first version of the target image for which there is only one salient point of the second version of the target image with a similar feature, such that a salient point of the first version is not a matching point when the similarity between that salient point of the first version and the most similar salient point of the second version is too close to the similarity between that salient point of the first version and the second most similar salient point of the second version;
      a component that identifies groups of matching points such that the matching points are proximate to each other in the first version and their matching points are also proximate to each other in the second version wherein a group represents a visual part, the component identifies a group by:
         selecting a first matching point;
         selecting a second matching point;
         selecting a third matching point; and
         when the second matching point and the third matching point are within a certain radius of the first matching point in both the first version and the second version, designating the first matching point, the second matching point, and the third matching point as being a group; and
      a component that identifies an image from the collection of images that matches the target image by comparing features of salient points of the images to features of the salient points of the visual parts of the target image, the image being identified based on number of salient points of the image that match salient points of the visual parts of the target image;
      a component that ranks identified images based on the number of visual parts of the identified images that correspond to a visual part of the target image; and
   a processor for executing the computer-executable instructions stored in the memory.

2. The system of claim 1 including:
   a component that identifies salient points within each version of the target image; and
   a component that generates a feature to represent each salient point.

3. The system of claim 2 wherein the component that identifies salient points and the component that generates a feature are based on a scale-invariant feature transform algorithm.

4. The system of claim 1 wherein a group includes three matching points.

5. The system of claim 1 wherein similarity is based on a distance metric in feature space.

6. The system of claim 1 including a component that identifies salient points within each version of the target image and generates a feature to represent each salient point based on a scale-invariant feature transform algorithm, and wherein a group includes three matching points.

7. A system for identifying whether an image is similar to a target image having a first version and a second version, comprising:
a memory storing computer-executable instructions of
a component that identifies visual parts of the target image, a visual part being identified as salient points of the first version with a feature of each salient point being similar to a feature of a matching salient point of the second version and the salient points of a visual part being proximate to each other in the first version and their matching points being proximate to each other in the second version, a visual part comprising three matching points such that two of the matching points are within a certain radius of the third matching point in both the first version and the second version; and
a component that determines whether an image is similar to the target image by identifying visual parts of the target image that are also visual parts of the image; and
a processor for executing the computer-executable instructions stored in the memory.

8. The system of claim 7 including an image store that maps features of salient points of images to images and wherein the component that determines selects candidate images from the image store that have features of salient points that are similar to features of the salient points of the visual part and indicates that an image is similar to the target image based on a count of visual parts of the target image that is similar to visual parts of the image.

9. The system of claim 7 wherein the component that determines whether an image is similar to the target image factors in proximity to each other of salient points of the image with similar features.

10. The system of claim 7 including a component that generates features for salient points of an image.

11. The system of claim 10 including a component that generates a mapping of features of salient points of images to images.

12. The system of claim 7 wherein a salient point of the second version does not match a salient point of the first version when their features are similar to the feature of another salient point of the second version.

13. The system of claim 7 wherein similarity is based on a distance metric in feature space.

14. The system of claim 7 including a component that identifies salient points within each version of the image and generates a feature to represent each salient point based on a scale-invariant feature transform algorithm, wherein a salient point of the second version does not match a salient point of the first version when their features are similar to the feature of another salient point of the second version, and wherein a group includes three matching points.

15. A system for searching for content, comprising:
a content store that maps features of salient points of images to images and maps images to content;
a memory storing computer-executable instructions of
a component that receives a first version and a second version of a target image;
a component that generates features of salient points of the target image;
a component that identifies matching points of the target image by comparing features of salient points of the first version to features of salient points of the second version, such that a salient point of the first version is not a matching point when the similarity between that salient point of the first version and the most similar salient point of the second version is too close to the similarity between that salient point of the first version and the second most similar salient point of the second version;
a component that identifies visual parts of the target image as a group of three or more matching points based on proximity of salient points of the matching points of the group to each other within a version of the target image, such that each of the matching points of a group are within a certain radius of another matching point of the group in both the first version and the second version;
a component that identifies images with features of salient points that are similar to the features of the salient points of the visual parts of the target image; and
a component that provides the content associated with the identified images as a search result; and
a processor for executing the computer-executable instructions stored in the memory.

16. The system of claim 15 wherein a visual part is identified as salient points of the first version with a feature of each salient point being similar to a feature of a matching salient point of the second version and the salient points of a visual part being proximate to each other and their matching points being proximate to each other.

17. The system of claim 15 wherein the identified images are ranked according to a count of the corresponding visual parts.

* * * * *